United States Patent
Jung

(10) Patent No.: US 11,243,715 B2
(45) Date of Patent: Feb. 8, 2022

(54) MEMORY CONTROLLER AND OPERATING METHOD THEREOF

(71) Applicant: SK hynix Inc., Gyeonggi-do (KR)

(72) Inventor: Sang Hune Jung, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 90 days.

(21) Appl. No.: 16/513,253

(22) Filed: Jul. 16, 2019

(65) Prior Publication Data

US 2020/0167095 A1 May 28, 2020

(30) Foreign Application Priority Data

Nov. 22, 2018 (KR) ........................ 10-2018-0145784

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0604; G06F 3/0659; G06F 3/0679
See application file for complete search history.

(56) References Cited

U.S. PATENT DOCUMENTS

| 6,412,045 | B1* | 6/2002 | DeKoning | G06F 12/0804 711/133 |
| 7,853,761 | B2* | 12/2010 | Masuo | G06F 12/0868 711/158 |
| 8,578,100 | B1* | 11/2013 | Huynh | G06F 12/0804 711/135 |
| 2003/0056059 | A1* | 3/2003 | Fox | G06F 3/0601 711/112 |
| 2005/0144379 | A1* | 6/2005 | Eschmann | G06F 12/0804 711/113 |
| 2005/0278486 | A1* | 12/2005 | Trika | G06F 12/0804 711/142 |
| 2011/0099325 | A1* | 4/2011 | Roh | G06F 3/0679 711/103 |
| 2011/0283066 | A1* | 11/2011 | Kurashige | G06F 12/0866 711/135 |
| 2011/0296123 | A1* | 12/2011 | Adler | G11C 14/0018 711/156 |
| 2012/0047332 | A1* | 2/2012 | Bannon | G06F 12/127 711/135 |
| 2012/0278541 | A1* | 11/2012 | Yamaki | G06F 12/0246 711/103 |
| 2016/0357481 | A1* | 12/2016 | Nam | G06F 3/0619 |
| 2018/0322051 | A1* | 11/2018 | Heller | G06F 13/16 |

FOREIGN PATENT DOCUMENTS

| KR | 10-2012-0002547 | 1/2012 |
| KR | 10-2015-0037365 | 4/2015 |

* cited by examiner

*Primary Examiner* — Yaima Rigol
(74) *Attorney, Agent, or Firm* — IP & T Group LLP

(57) ABSTRACT

A memory controller for processing a flush request includes: a request message controller configured to generate a command or control signal in response to a request of a host, a delay time determiner configured to, when the request is a current flush request, generate delay information based on a number of write requests between a last received flush request before the current flush request and the received flush request and a response message controller configured to generate a flush response corresponding to the received flush request message based on the delay information.

20 Claims, 12 Drawing Sheets

FIG. 5

| WRITE REQUEST : FLUSH REQUEST (WRITE_REQ) (FLUSH_REQ) | WHETHER FLUSH RESPONSE MESSAGE IS TO BE DELAYED | DELAY TIME |
|---|---|---|
| 1 : 1 | X | · |
| 2 : 1 | X | · |
| ⋮ | ⋮ | ⋮ |
| P1 : 1 | O | Q1 |
| P2 : 1 | O | Q2 |

FIG. 6

| TIME | FLUSH REQUEST (FLUSH_REQ) | FLUSH RESPONSE (FLUSH_RES) |
|---|---|---|
| t0 | FLUSH_REQ1 | |
| t1 | | FLUSH_RES1 |
| t2 | FLUSH_REQ2 | |
| t3 | FLUSH_REQ3 | |
| t4 | FLUSH_REQ4 | |
| t5 | | FLUSH_RES2 |
| t6 | FLUSH_REQ5 | |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2018-0145784, filed on Nov. 22, 2018, the entire disclosure of which is herein incorporated by reference in its entirety.

BACKGROUND

Field of Invention

The present disclosure generally relates to an electronic device, and more particularly, to a memory controller and an operating method thereof.

Description of Related Art

A storage device stores data under the control of a host device such as a computer, a smart phone or a smart pad. The storage device includes a device for storing data on a magnetic disk, such as a Hard Disk Drive (HDD), or a device for storing data on a semiconductor memory, i.e., a nonvolatile memory, such as a Solid State Drive (SSD) or a memory card.

The storage device may include a memory device for storing data and a memory controller for controlling the memory device. The memory device is classified as a volatile memory device or a nonvolatile memory device. Examples of a nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a memory controller for processing a flush request and an operating method thereof.

In accordance with an aspect of the present disclosure, there is provided a memory controller including: a request message controller configured to generate a command or control signal in response to a request of a host, a delay time determiner configured to, when the request is a flush request, generate delay information based on a number of write requests received between a last received flush request before the flush request and the flush request and a response message controller configured to generate a flush response corresponding to the flush request based on the delay information.

In accordance with another aspect of the present disclosure, there is provided a memory controller including: a delay time determiner configured to receive a request from a host, and when the request of the host is a flush request, generate delay information on a delay time of a flush response based on a number of write requests between the flush request and a last received flush request before the flush request and a response message controller configured to delay generation of a flush response corresponding to the flush request based on the delay information.

In accordance with still another aspect of the present disclosure, there is provided a method for operating a memory controller for controlling an operation of a memory device, based on a request message from a host, the method including: receiving a flush request from the host, generating delay information, based on a number of write requests received between a last received flush request before the flush request and the flush request and determining a delay time of a flush response corresponding to the flush request based on the delay information.

In accordance with still another aspect of the present disclosure, there is provided a method for operating a memory device, the method including: receiving one or more write requests and then a flush request, buffering, while receiving the write requests, corresponding write commands, flushing, in response to the flush request, the write commands into the memory device to perform write operations in response to the write requests and delaying, when a number of the write commands or the write requests is greater than or equal to a threshold, output of a flush response corresponding to the flush request by an amount of time corresponding to the number.

BRIEF DESCRIPTION OF THE DRAWINGS

Various embodiments will now be described more fully with reference to the accompanying drawings; however, aspects and features of the present invention may be embodied in different forms, configurations or arrangements. Thus, the present invention is not limited to the embodiments set forth herein. Rather, these embodiments are provided so that this disclosure is thorough and complete and fully conveys the scope of the embodiments to those skilled in the art. Also, throughout the specification, reference to "an embodiment," "another embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 is a diagram illustrating a delay table, such as that shown in FIG. 4.

FIG. 6 is a diagram illustrating that flush requests are accumulated.

DETAILED DESCRIPTION

Figure 1:
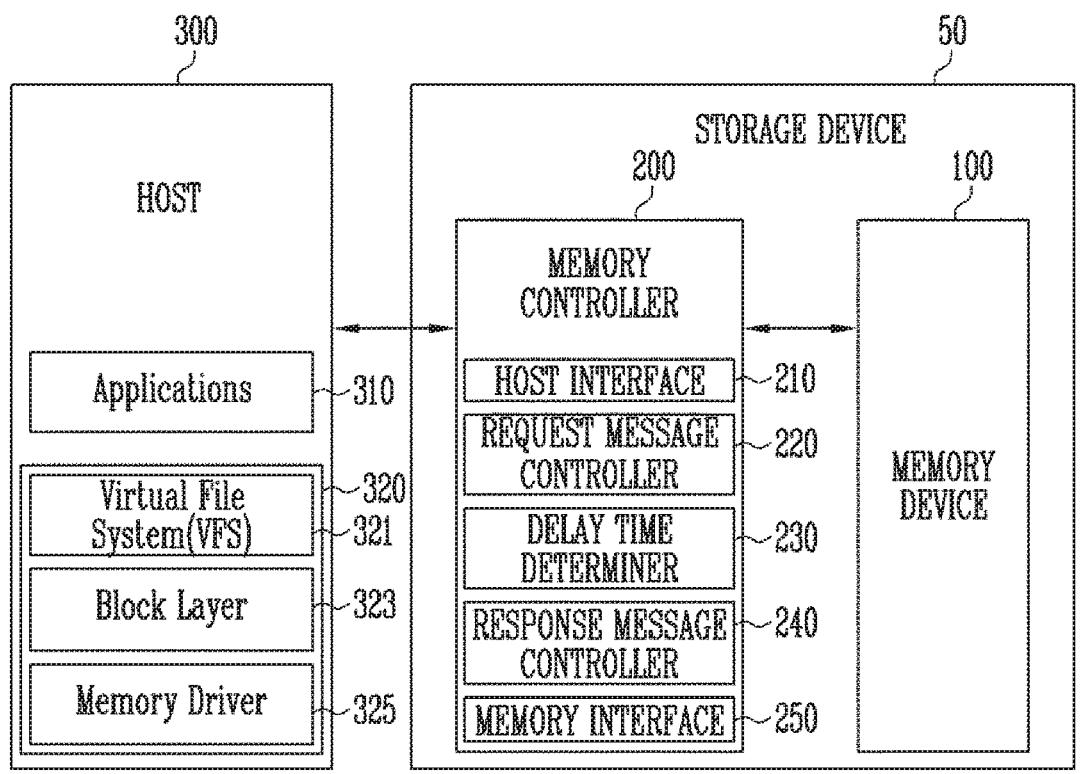
FIG. 1 is a block diagram illustrating a storage device in accordance with an embodiment of the present disclosure.

The specific structural and functional description herein is for the purpose of describing embodiments in accordance with the concept of the present invention. The embodiments can be implemented in various forms, and thus the present invention is not limited to the embodiments set forth herein.

The embodiments of the present disclosure can be modified in various ways. While embodiments are described and illustrated herein in detail, the present invention is not limited to specific details. Rather, the present invention includes all changes, equivalents, or substitutes that do not depart from the spirit and technical scope of the present disclosure.

While terms such as "first" and "second" may be used to identify various components, such components are not limited by the above terms. The above terms are used only to distinguish one component from another that otherwise have the same or similar names. For example, a first component in one instance may be referred to as a second component in another instance, and vice versa, without departing from the scope of rights of the present invention.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Other expressions describing relationships between components such as "~between," "immediately ~, between" or "adjacent to ~" and "directly adjacent to ~" may be construed similarly.

The terms in the present application are used to describe particular embodiments, not to limit the present invention. Singular forms in the present disclosure are intended to include the plural forms as well, unless the context clearly indicates otherwise. It will be further understood that open-ended terms, such as "including" or "having," are intended to indicate the existence of stated features, numbers, operations, actions, components, parts, or combinations thereof but are not intended to preclude the possibility that one or more other features, numbers, operations, actions, components, parts, or combinations thereof may exist or may be added.

So far as not being differently defined, all terms used herein including technical or scientific terminologies have meanings that are commonly understood by those skilled in the art to which the present disclosure pertains. Ordinary dictionary-defined terms should be understood such that they have meanings consistent with the context of the related technique. So far as not being clearly defined in this application, terms should not be understood in an ideally or excessively formal way.

In describing embodiments, description of techniques that are well known to the art to which the present disclosure pertains and not directly related to the present disclosure is omitted. This is done to avoid unnecessarily obscuring the present invention.

Various embodiments of the present disclosure will be described in detail below with reference to the accompanying drawings in order for those skilled in the art to be able to readily implement or practice the present invention.

FIG. 1 is a block diagram illustrating a storage device in accordance with an embodiment of the present disclosure.

Referring to FIG. 1, the storage device 50 may include a memory device 100 and a memory controller 200.

The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with any of various types of storage devices such as a multi-media card of a Solid State Drive (SSD), a Multi-Media Card (MMC), an embedded, Multi-Media Card (eMMC), a Reduced Size, Multi-Media Card (RS-MMC), and a micro-Multi-Media Card (micro-MMC) type, a Secure Digital (SD) card of a Secure Digital (SD), a mini-Secure Digital (mini-SD) and a micro-Secure Digital (micro-SD) type, an Universal Serial Bus (USB) storage device, a Universal Flash Storage (UFS) device, a storage device of a Personal Computer Memory Card International Association (PCM-CIA) card type, a storage device of a Peripheral Component Interconnection (PCI) card type, a storage device of a PCI-Express (PCI-e or PCIe) card type, a Compact Flash (CF) card, a smart media card, and a memory stick.

The storage device 50 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of planes. Each plane may include a plurality of memory blocks BLK1 to BLKz. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (SU-RAM), or the like. In this specification, by way of example, embodiments are described in the context of the memory device 100 as a NAND flash memory.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells included in the memory device 100 may be configured as a Single Level Cell (SLC) for storing one data bit, a Multi-Level Cell (MLC) for storing two data bits, a Triple Level Cell (TLC) for storing three data bits, or a Quad Level Cell (QLC) for storing four data bits.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory device 100 may perform a program operation or an erase operation with a set operating voltage under the control of the memory controller 200.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, logical-physical address mapping information that establishes a mapping relationship between the LBA and the PBA.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance.

In an embodiment, the memory controller 200 may include a host interface 210. The host interface 210 may communicate with the host 300. Specifically, the host interface 210 may receive a request message REQ_MES from the host 300 and provide the request message REQ_MES to a request message controller 220. The request message REQ_MES may be any of a program (write) request, a read request, and a flush request. The request message REQ_MES received from the host 300, however, is not limited to these types of requests; rather, the request message REQ_MES may direct any other type of operation suitable for performance of the memory device 100.

In an embodiment, the memory controller 200 may include the request message controller 220. The request message controller 220 may receive a request message REQ_MES, which requests the memory device 100 to perform a specific operation, from the host 300. The request message controller 220 may generate a write command WRITE_CMD or flush control signal FLUSH_SIG, based on the request message REQ_MES of the host 300. The generated write command WRITE_CMD may be stored in a buffer memory (not shown) of the request message controller 220. When the number of write commands stored in the buffer memory reaches a set number, the write commands stored in the buffer memory may be provided to the memory device 100 through the memory interface 250.

Specifically, the write command WRITE_CMD may be output from the memory controller 200 to the memory device 100. The write command WRITE_CMD may be for storing specific data in the memory device 100. The flush control signal FLUSH_SIG may be for controlling a flush operation on the write command WRITE_CMD generated in the memory controller 200. The write command WRITE_CMD and the flush control signal FLUSH_SIG will be described in more detail with reference to FIGS. 2 and 3.

In an embodiment, the memory controller 200 may include a delay time determiner 230. The delay time determiner 230 may determine whether a flush response FLUSH_RES corresponding to a flush request FLUSH_REQ of the host 300 is to be delayed and a delay time of the flush response FLUSH_RES. The delay time determiner 230 may determine whether the flush response FLUSH_RES is to be delayed and a delay time of the flush response FLUSH_RES, based on the flush control signal FLUSH_SIG and the write command WRITE_CMD. The delay time determiner 230 may generate delay information DELAY_INF including whether the flush response FLUSH_RES is to be delayed and a delay time of the flush response FLUSH_RES.

In an embodiment, the memory controller 200 may include a response message controller 240. The response message controller 240 may generate a flush response FLUSH_RES in response to the flush request FLUSH_REQ of the host 300.

In an embodiment, the memory controller 200 may include a memory interface 250. The memory interface 250 may communicate with the memory device 100. Specifically, the memory interface 250 may receive a write command WRITE_CMD from the request message controller 220. The memory interface 250 may provide the received write command WRITE_CMD to the memory device 100. The memory device 100 may perform an operation corresponding to the write command WRITE_CMD.

The host 300 may communicate with the storage device 50 using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The host 300 may include applications 310 and a kernel 320.

In an embodiment, the applications 310 are application programs, and may be designed to perform a request of the host 300. The applications may be programs designed such that the host 300 performs a specific operation in the storage device 50.

The kernel 320 may generate or remove an operation process to be performed in the storage device 50. The kernel 320 may allocate and perform a process necessary for the operation process. The kernel 320 may include a virtual file system (VFS) 321, a block layer 323, and a memory driver 325.

In an embodiment, the VFS 321 is a virtual file system, and may be configured as a system that enables the host 300 to access the storage device 50. The VFS 321 may manage a directory between the host 300 and the storage device 50, to access data stored in the storage device 50.

The block layer 323 may provide an interface such that the applications 310 can access the storage device 50. The block layer 323 may provide an interface capable of accumulating or holding requests of the host 300 and transmitting the held requests to the storage device 50. In an embodiment, the block layer 323 may perform an elevator flush policy of the host 300.

The elevator flush policy refers to merging of a plurality of write commands corresponding to flush requests respectively. Specifically, the plurality of write commands corresponding to the flush requests of the host 300 may not be provided to the memory controller 200 until before the host 300 receives a flush response FLUSH_RES corresponding to the flush request FLUSH_REQ of the host 300. Therefore, the host 300 may merge the plurality of write commands corresponding to the flush requests until the host 300 receives a flush response FLUSH_RES.

The memory driver 325 may control the host 300 and the storage device 50 to communicate with each other. Specifically, the host 300 may transmit data to the host 300 or receive data from the host 300 through the memory driver 325.

In an embodiment, the memory driver 325 may merge the held flush requests, based on the elevator flush policy. Specifically, the flush requests received from the block layer 323 may be held in the memory driver 325. That is, one flush operation may be performed by merging multiple write commands. The memory driver 325 may provide the held write commands to the storage device 50.

Figure 2:
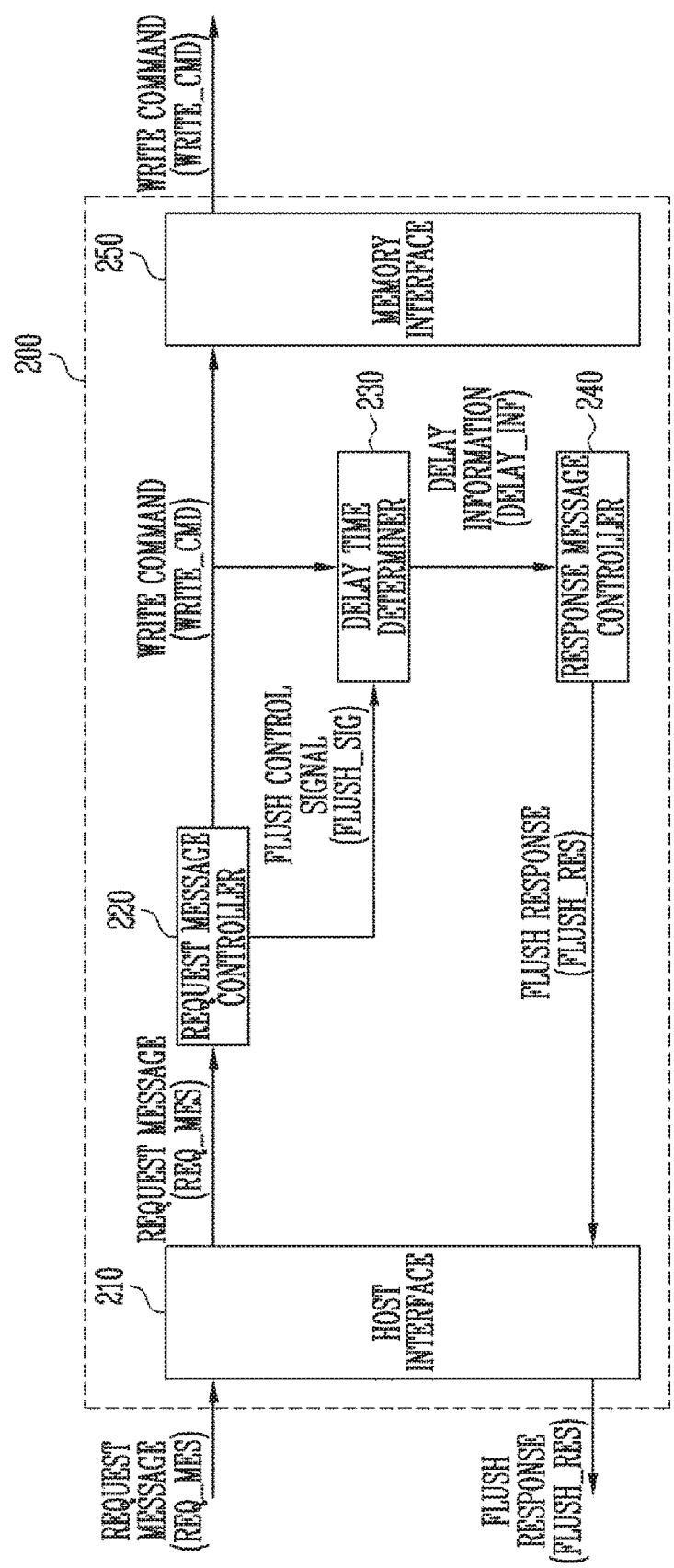
FIG. 2 is a diagram illustrating a memory controller, such as that shown in FIG. 1.

FIG. 2 is a diagram illustrating the memory controller 200 shown in FIG. 1.

Referring to FIG. 2, the memory controller 200 may include the host interface 210, the request message controller 220, the delay time determiner 230, the response message controller 240, and the memory interface 250.

The host interface 210 may communicate with the host 300. Specifically, the host interface 210 may receive a request message REQ_MES from the host 300 and provide the request message REQ_MES to the request message controller 220.

The request message REQ_MES may be any of a program (write) request, a read request, a flush request, and other type of request.

Another embodiment of the method in which the host interface 210 provides the request message REQ_MES will be described with reference to FIG. 3.

The request message controller 220 may receive a request message REQ_MES from the host 300. The request message controller 220 may generate a command or control signal in response to the request message REQ_MES of the host 300.

When the request message REQ_MES is a write request WRITE_REQ, the request message controller 220 may generate a write command WRITE_CMD. The generated write command WRITE_CMD may be stored in a buffer memory of the request message controller 220. When a certain number of write commands are stored in the buffer memory, the write commands stored in the buffer memory may be provided to the memory device 100 through the memory interface 250. The write command WRITE_CMD also may be provided to the delay time determiner 230 in addition to the memory device 100.

When the request message REQ_MES is a flush request FLUSH_REQ, the request message controller 220 may generate a flush control signal FLUSH_SIG. The generated flush control signal FLUSH_SIG may be provided to the delay time determiner 230. The flush control signal FLUSH_SIG may be generated after write commands corresponding to write requests received between the current flush request and a previous flush request are stored in the buffer memory. As used herein, the previous flush request may be the flush request immediately prior to the current flush request, i.e., the last flush request.

The delay time determiner 230 may receive the flush control signal FLUSH_SIG and the write command WRITE_CMD, which are generated from the request message controller 220. The delay time determiner 230 may generate delay information DELAY_INF by using the received flush control signal FLUSH_SIG and the received write command WRITE_CMD. The delay information DELAY_INF may include information on whether a flush response FLUSH_RES corresponding to the flush request FLUSH_REQ of the host 300 is to be delayed and, if the flush request FLUSH_REQ is to be delayed, an amount of time of the delay (delay time).

Specifically, the delay time determiner 230 may receive the write command WRITE_CMD before the delay time determiner 230 receives the flush control signal FLUSH_SIG. When the delay time determiner 230 receives the write command WRITE_CMD, the delay time determiner 230 may not generate the delay information DELAY_INF. The delay time determiner 230 may generate delay information DELAY_INF when or after the delay time determiner 230 receives the flush control signal FLUSH_SIG.

In an embodiment, when the delay time determiner 230 receives a flush control signal FLUSH_SIG corresponding to the flush request FLUSH_REQ, the delay time determiner 230 may generate delay information DELAY_INF. The delay information DELAY_INF may be generated based on a number of write requests received between the current flush request and previous flush request.

That is, when the delay time determiner 230 receives the flush control signal FLUSH_SIG, the delay information DELAY_INF may be generated based on a number of write commands received before the current flush control signal FLUSH_SIG is received. The write commands received before the current flush control signal FLUSH_SIG is received may be write commands received between the current and previous flush control signals FLUSH_SIG.

The delay information DELAY_INF may include information for output of a flush response FLUSH_RES corresponding to the flush request FLUSH_REQ.

Specifically, the delay information DELAY_INF may indicate whether the flush response FLUSH_RES is to be delayed. When the number of write commands received between current and previous flush control signals FLUSH_SIG is a certain threshold number, the flush response FLUSH_RES may be delayed. The delay time of the flush response FLUSH_RES may be set based on the number of write commands received between current and previous flush control signals FLUSH_SIG. The delay time set based on the number of write commands may be for optimizing Input/Output Operations Per Second (IOPS).

The response message controller 240 may generate a flush response FLUSH_RES corresponding to the flush request FLUSH_REQ. Specifically, the flush response FLUSH_RES may be generated when the response message controller 240 receives the delay information DELAY_INF from the delay time determiner 230.

In an embodiment, when the delay information DELAY_INF indicates that the flush response FLUSH_RES is not to be delayed, the response message controller 240 may immediately generate the flush response FLUSH_RES upon receipt of the delay information DELAY_INF, and output the flush response FLUSH_RES to the host 300 through the host interface 210.

In an embodiment, the delay information DELAY_INF may indicate that the flush response FLUSH_RES is to be delayed and information on a delay time of the flush response FLUSH_RES. The response message controller 240 may generate a flush response FLUSH_RES, based on the delay information DELAY_INF, delay the flush response FLUSH_RES generated based on the delay information DELAY_INF, and output the delayed flush response FLUSH_RES to the host 300 through the host interface 210. The delay time of the output flush response FLUSH_RES may be set based on a number of write commands received between current and previous flush control signals FLUSH_SIG.

The memory interface 250 may communicate with the memory device 100. Specifically, the memory interface 250 may receive a write command WRITE_CMD from the request message controller 220. The memory interface 250 may provide the received write command WRITE_CMD to the memory device 100. The memory device 100 may perform an operation corresponding to the write command WRITE_CMD.

Figure 3:
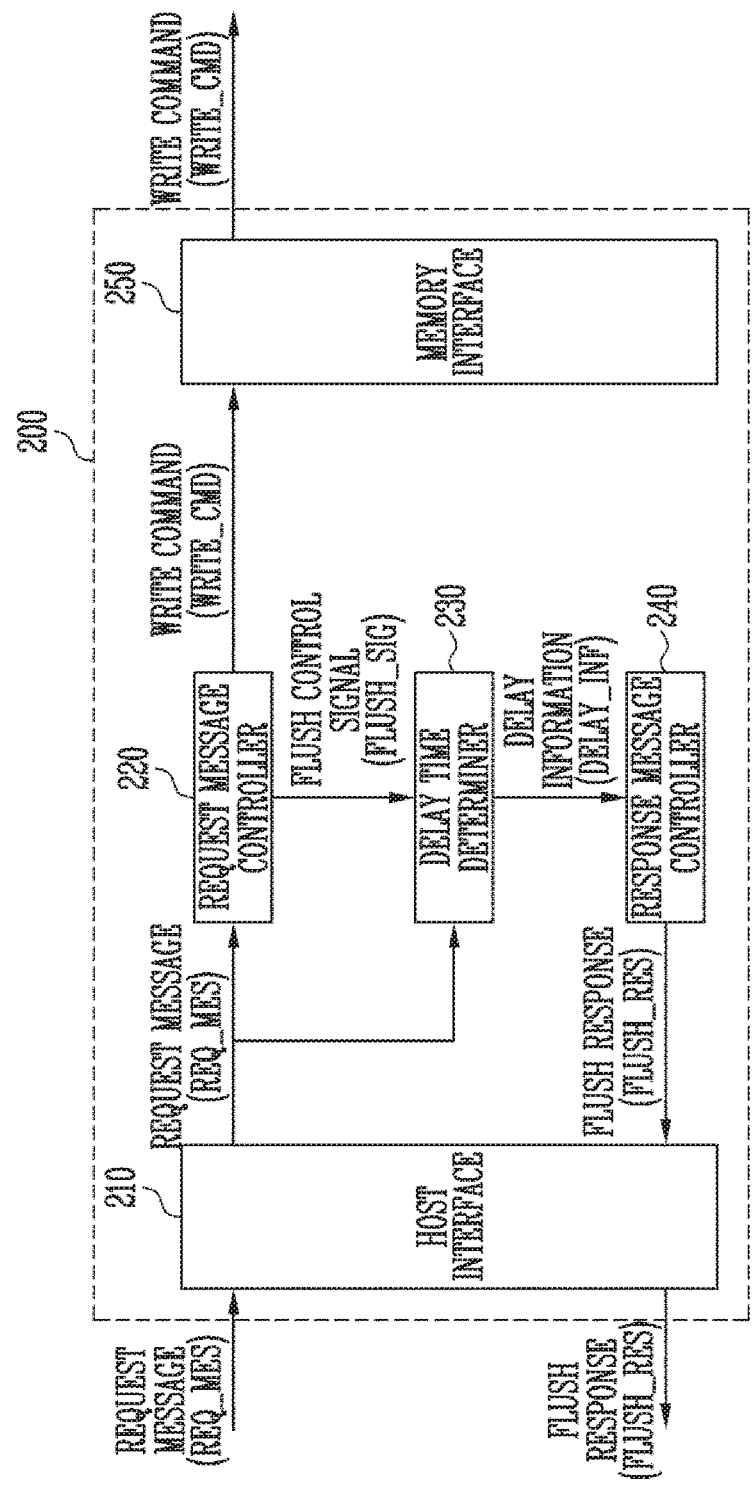
FIG. 3 is a diagram illustrating another embodiment of a memory controller, such as that shown in FIG. 1.

FIG. 3 is a diagram illustrating another embodiment of the memory controller 200 shown in FIG. 1.

Referring to FIG. 3, the memory controller 200 may include the host interface 210, the request message controller 220, the delay time determiner 230, the response message controller 240, and the memory interface 250.

The host interface 210 may communicate with the host 300. Specifically, the host interface 210 may receive a request message REQ_MES from the host 300 and provide the request message REQ_MES to the request message controller 220 and the delay time determiner 230.

The request message REQ_MES may be any of a program (write) request, a read request, a flush request, and other type of request.

The request message controller 220 may generate a write command WRITE_CMD corresponding to a write request WRITE_REQ among request messages REQ_MES received from the host 300. The generated write command WRITE_CMD may be stored in a buffer memory of the request message controller 220. When a certain threshold number of write commands are stored in the buffer memory, the stored write commands may be provided to the memory device 100 through the memory interface 250.

The delay time determiner 230 may generate delay information DELAY_INF by using the request message REQ_MES received from the host 300. The delay information DELAY_INF may determine whether a flush response FLUSH_RES is to be delayed and a delay time of the flush response FLUSH_RES.

In an embodiment, the delay time determiner 230 may receive a write request WRITE_REQ before the delay time determiner 230 receives a flush request FLUSH_REQ. When the delay time determiner 230 receives the write request WRITE_REQ, the delay time determiner 230 may not generate the delay information DELAY_INF. After the delay time determiner 230 receives the flush request FLUSH_REQ, the delay time determiner 230 may generate the delay information DELAY_INF.

In an embodiment, when the delay time determiner 230 receives a flush request FLUSH_REQ of the host 300, the delay time determiner 230 may generate delay information DELAY_INF. The delay information DELAY_INF may be generated based on a number of write requests received between current flush request and previous flush request.

The delay information DELAY_INF may include information for output of a flush response FLUSH_RES corresponding to the flush request FLUSH_REQ.

Specifically, the delay information DELAY_INF may indicate whether the flush response FLUSH_RES is to be delayed. When the number of write commands received between current flush request and previous flush request is a certain threshold number, the flush response FLUSH_RES may be delayed. The delay time of the flush response FLUSH_RES may be set based on the number of write commands received between current flush request and previous flush request. The delay time set based on the number of write commands may be for optimizing Input/Output Operations Per Second (IOPS).

The response message controller 240 may generate a flush response FLUSH_RES corresponding to the flush request FLUSH_REQ. Specifically, the flush response FLUSH_RES may be generated when the response message controller 240 receives the delay information DELAY_INF from the delay time determiner 230.

In an embodiment, when the delay information DELAY_INF indicates that the flush response FLUSH_RES is not delayed, the response message controller 240 may immediately generate the flush response FLUSH_RES after the delay information DELAY_INF is received, and output the flush response FLUSH_RES to the host 300 through the host interface 210.

In an embodiment, the delay information DELAY_INF may indicate that the flush response FLUSH_RES is delayed and include information on a delay time of the flush response FLUSH_RES. The response message controller 240 may generate a flush response FLUSH_RES, based on the delay information DELAY_INF, delay the flush response FLUSH_RES generated based on the delay information DELAY_INF, and output the delayed flush response FLUSH_RES to the host 300 through the host interface 210. The delay time of the output flush response FLUSH_RES may be set based on a number of write requests received between current flush request and previous flush request.

The memory interface 250 may communicate with the memory device 100. Specifically, the memory interface 250 may receive a write command WRITE_CMD from the request message controller 220. The memory interface 250 may provide the received write command WRITE_CMD to the memory device 100. The memory device 100 may perform an operation corresponding to the write command WRITE_CMD.

Figure 4:
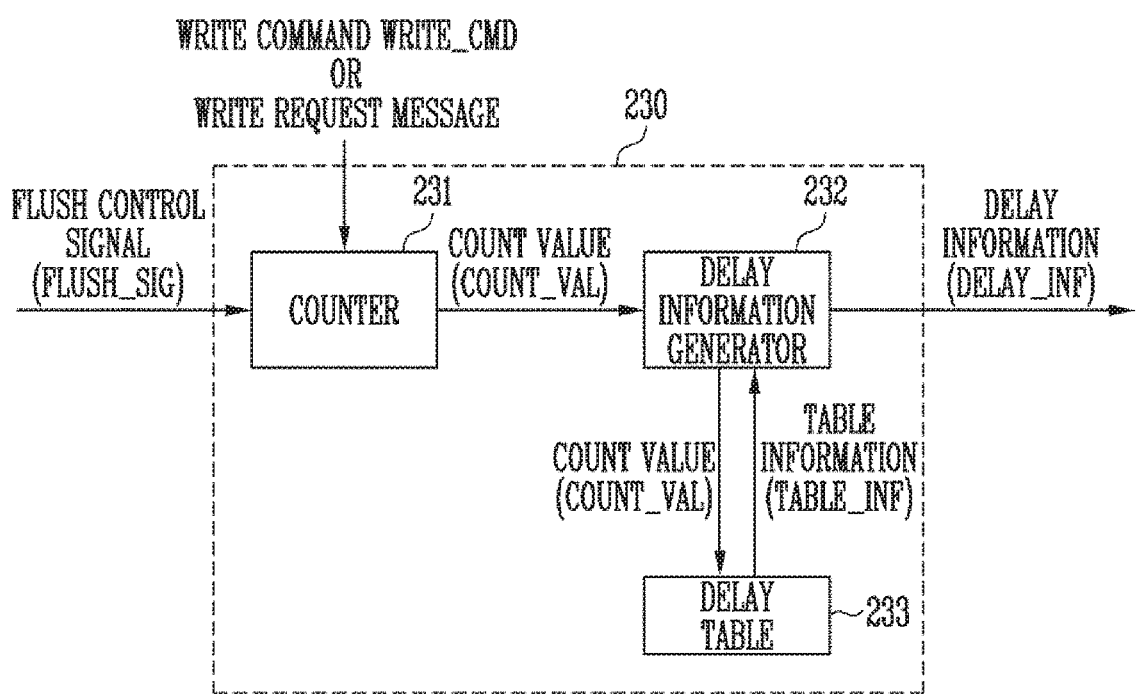
FIG. 4 is a diagram illustrating a delay time determiner, such as that shown in FIGS. 2 and 3.

FIG. 4 is a diagram illustrating the delay time determiner 230 shown in FIGS. 2 and 3.

Referring to FIG. 4, the delay time determiner 230 may include a counter 231, a delay information generator 232, and a delay table 233.

The counter 231 may output a count value COUNT_VAL, based on the flush control signal FLUSH_SIG and either the write command WRITE_CMD or write request WRITE_REQ, which are provided from the request message controller 220. The count value COUNT_VAL may be obtained by counting a number of write commands generated in the request message controller 220 or a number of write requests provided from the host 300.

Specifically, after the counter 231 receives the flush control signal FLUSH_SIG, the counter 231 may count a number of write commands or a number of write requests provided. In either case, the number that is counted may be those received between current and previous flush control signals FLUSH_SIG. When the counter 231 receives the flush control signal FLUSH_SIG, the counter 231 may output the count value COUNT_VAL to the delay information generator 232.

In an embodiment, the number of write commands or the number of write requests may be counted as follows. As the write commands or the write requests are input one by one to the counter 231, the counter 231 may increase the count value COUNT_VAL by 1 as each is input. After the counter 231 outputs the count value COUNT_VAL to the delay information generator 232, the count value COUNT_VAL may be initialized to 0 to start the count again. After the count value COUNT_VAL is initialized to 0, the count value COUNT_VAL may be increased by 1 as the next set of write commands or the write requests are input to the counter 231.

The delay information generator 232 may receive a count value COUNT_VAL from the counter 231. The delay information generator 232 may provide the count value COUNT_VAL to the delay table 233. The delay information generator 232 may generate delay information DELAY_INF, based on the count value COUNT_VAL provided from the counter 231 and table information TABLE_INF provided from the delay table 233.

That is, the delay information DELAY_INF may include information on whether a flush response FLUSH_RES corresponding to the flush request FLUSH_REQ is to be delayed and a delay time of the flush response FLUSH_RES.

The generated delay information DELAY_INF may be provided to the response message controller 240. Specifically, the count value COUNT_VAL may be a number of write requests corresponding to the current flush request FLUSH_REQ. The write requests corresponding to a current flush request FLUSH_REQ may be those provided between current flush request and previous flush request.

The delay table 233 may provide table information TABLE_INF to the delay information generator 232, based on the count value COUNT_VAL provided from the delay information generator 232. The table information TABLE_INF may include information on whether a flush response FLUSH_RES corresponding to the count value COUNT_VAL is to be delayed and a delay time of the flush response FLUSH_RES. The delay table 233 will be described in more detail with reference to FIG. 5.

When the delay information generator 232 receives the table information TABLE_INF from the delay table 233, the delay information generator 232 may generate delay information DELAY_INF. The delay information DELAY_INF may include information on whether a flush response FLUSH_RES corresponding to the flush request FLUSH_REQ is to be delayed and a delay time of the flush response FLUSH_RES.

FIG. 5 is a diagram illustrating the delay table 233 shown in FIG. 4.

Referring to FIG. 5, the delay table 233 may store information on whether a flush response FLUSH_RES is to be delayed and a delay time of the flush response FLUSH_RES according to the number of write requests corresponding to the flush request FLUSH_REQ (i.e., first field "WRITE REQUEST (WRITE_REQ): FLUSH REQUEST (FLUSH_REQ)" of the table shown in FIG. 5).

Specifically, a number of write requests corresponding to a present flush request FLUSH_REQ may be the number of write requests provided between present flush request and previous flush request.

In an embodiment, when the number of write requests corresponding to the flush request FLUSH_REQ is 1 or 2, the flush response FLUSH_RES may not be delayed. When a certain number of write requests are not received based on the elevator flush policy, the flush response FLUSH_RES may not be delayed.

When the flush response FLUSH_RES is not to be delayed, the generated delay information DELAY_INF may indicate that. In that case, the delay information DELAY_INF may not include information on a delay time. When the delay information DELAY_INF including information that the flush response FLUSH_RES is not delayed is generated, the response message controller 240 may immediately output the flush response FLUSH_RES after the response message controller 240 receives the delay information DELAY_INF or upon receipt of such information.

In an embodiment, when the number of write requests corresponding to the flush request FLUSH_REQ is P1 or P2, the flush response FLUSH_RES may be delayed. Each of P1 and P2 may be a natural number of 20 or more, with P2 being greater than P1. For example, P1 may be "100" and P2 may be "1000" greater than P1. P1 may be a reference number for determining whether the flush response FLUSH_RES is to be delayed.

When the flush response FLUSH_RES is to be delayed, delay information DELAY_INF including information that the flush response FLUSH_RES is delayed may be generated. The delay information DELAY_INF may further include information on a delay time of the flush response FLUSH_RES.

Specifically, when the number of write requests corresponding to the flush request FLUSH_REQ is P1, the delay information DELAY_INF may include information that the flush response FLUSH_RES is to be delayed and information on a delay time Q1. Q1 may be 1000 μs. Q1 may be predetermined. When the number of write requests corresponding to the flush request FLUSH_REQ is P2, the delay information DELAY_INF may include information that the flush response FLUSH_RES is to be delayed and information on a delay time Q2. Q2 may be 2000 µs longer than Q1. Q2 may be predetermined. That is, when P2 is greater than P1, Q2 is longer than Q1. When the delay information DELAY_INF including the information that the flush response FLUSH_RES is to be delayed is generated, the response message controller 240 may output the flush response FLUSH_RES after the delay time included in the delay information DELAY_INF elapses.

FIG. 6 is a diagram illustrating that flush requests are accumulated or held.

Referring to FIG. 6, the request message controller 220 may receive first to fifth flush requests FLUSH_REQ1 to FLUSH_REQ5 from the host 300 through the host interface 210. The response message controller 240 may output to the host 300 through the host interface 210 flush responses FLUSH_RES1 to FLUSH_RES5 corresponding to the flush requests FLUSH_REQ1 to FLUSH_REQ5.

At t0, the request message controller 220 may receive the first flush request FLUSH_REQ1 from the host 300. After the request message controller 220 receives the first flush request FLUSH_REQ1, the request message controller 220 may store write commands corresponding to write requests corresponding to the first flush request FLUSH_REQ1. The response message controller 240 may not output a first flush response FLUSH_RES1 to the host 300 until the write commands are all stored in the request message controller 220. The first flush response FLUSH_RES1 may correspond to the first flush request FLUSH_REQ1. After write commands corresponding to the first flush request FLUSH_REQ1 are all stored in the request message controller 220, the response message controller 240 may output the first flush response FLUSH_RES1 to the host 300.

At t1, after write commands corresponding to the first flush request FLUSH_REQ1 are all stored in the request message controller 220, the first flush response FLUSH_RES1 may be output to the host 300. Specifically, after the write commands corresponding to the first flush request FLUSH_REQ1 are all stored in the request message controller 220, the request message controller 220 may provide a flush control signal FLUSH_SIG to the delay time determiner 230. The delay time determiner 230 may generate delay information DELAY_INF based on the number of write commands corresponding to the flush request FLUSH_REQ, and provide the delay information DELAY_INF to the response message controller 240. The response message controller 240 may provide a flush response FLUSH_RES based on the delay information DELAY_INF to the host 300 through the host interface 210.

At the t1, before the first flush response FLUSH_RES1 is output to the host 300, the request message controller 220 may not receive the second to fifth flush requests FLUSH_REQ2 to FLUSH_REQ5 from the host 300. At the t1, the first flush response FLUSH_RES1 provided to the host interface 210 may not be delayed since the number of write requests corresponding to the first flush request FLUSH_REQ may be less than a reference number P1.

At t2, the request message controller 220 may receive the second flush request FLUSH_REQ2 from the host 300 through the host interface 210. After the request message controller 220 receives the second flush request FLUSH_REQ2, the request message controller 220 may store write commands corresponding to write requests corresponding to the second flush request FLUSH_REQ2. The response message controller 240 may not output a second flush response FLUSH_RES2 to the host 300 until the write commands are all stored in the request message controller 220. The second flush response FLUSH_RES2 may correspond to the second flush request FLUSH_REQ2. After the write commands corresponding to the second flush request FLUSH_REQ2 are all stored in the request message controller 220, the response message controller 240 may output the second flush response FLUSH_RES2 to the host 300.

At the t2, after the request message controller 220 receives the second flush request FLUSH_REQ2 from the host 300, the request message controller 220 may not output the second flush response FLUSH_RES2 to the host 300. The case where the second flush response FLUSH_RES2 is not output to the host 300 may be a case where write commands corresponding to the second flush response FLUSH_RES2 are not all stored in the request message controller 220. In another embodiment, the case where the second flush response FLUSH_RES2 is not output to the host 300 may be a case where the number of write requests corresponding to the second flush response FLUSH_RES2 is greater than or equal to the reference number P1.

At t3, the response message controller 240 is in a state in which it does not output the second flush response FLUSH_RES2, and hence the request message controller 220 cannot receive the third flush request FLUSH_REQ3 from the host 300 through the host interface 210. Therefore, at the t3, the third flush request FLUSH_REQ3 may be in a state in which it is held in the host 300.

At t4, the response message controller 240 is in a state in which it does not output the second flush response FLUSH_RES2, and hence the request message controller 220 cannot receive the fourth flush request FLUSH_REQ4 from the host 300 through the host interface 210. Therefore, at the t4, the fourth flush request FLUSH_REQ4 may be in a state in which it is held in the host 300.

At the t4, the third and fourth flush request FLUSH_REQ3 and FLUSH_REQ4s may be held in the host 300. Further, write requests corresponding to the third flush request FLUSH_REQ3 and write requests corresponding to the fourth flush request FLUSH_REQ4 may be held in the host 300.

At t5, after write commands corresponding to the second flush request FLUSH_REQ2 are all stored in the request message controller 220, the second flush response FLUSH_RES2 may be output to the host 300. Specifically, the write commands corresponding to the second flush request FLUSH_REQ2 may be the ones received between first and second flush requests FLUSH_REQ1 and FLUSH_REQ2.

At the t5, after the second flush response FLUSH_RES2 is output to the host 300, the write requests held in the host 300 may be provided to the request message controller 220 through the host interface 210. Specifically, the write requests held in the host 300 may include write requests supposed to be provided between second and third flush requests FLUSH_REQ2 and FLUSH_REQ3 and write requests supposed to be provided between third and fourth flush requests FLUSH_REQ3 and FLUSH_REQ4. Therefore, after the second flush response FLUSH_RES2 is output to the host 300, the write requests held in the host 300 may be provided to the request message controller 220 through the host interface 210.

When the write requests held in the host 300 are provided to the request message controller 220, corresponding flush requests may be merged. In an embodiment, the third and fourth flush requests FLUSH_REQ3 and FLUSH_REQ4 may be merged since they are held due to the delay of the second flush response FLUSH_RES2. When the write requests held in the host 300 are provided to the request message controller 220, the host 300 may not provide the third flush request FLUSH_REQ3 to the host interface 210. Since the third and fourth flush requests FLUSH_REQ3 and FLUSH_REQ4 are merged, the host 300 may provide only the fourth flush request FLUSH_REQ4 to the request message controller 220 through the host interface 210.

After write commands corresponding to the merged third and fourth flush requests FLUSH_REQ3 and FLUSH_REQ4 are all stored in the request message controller 220, a fourth flush response FLUSH_RES4 may be output to the host 300 in response to the merged third and fourth flush requests FLUSH_REQ3 and FLUSH_REQ4.

At t6, the response message controller 240 is in a state in which it does not output the fourth flush response FLUSH_RES4 to the host 300, and hence the request message controller 220 cannot receive the fifth flush request FLUSH_REQ5 from the host 300. Therefore, at the t6, the fifth flush request FLUSH_REQ5 may be in a state in which it is held in the host 300.

Figure 7:
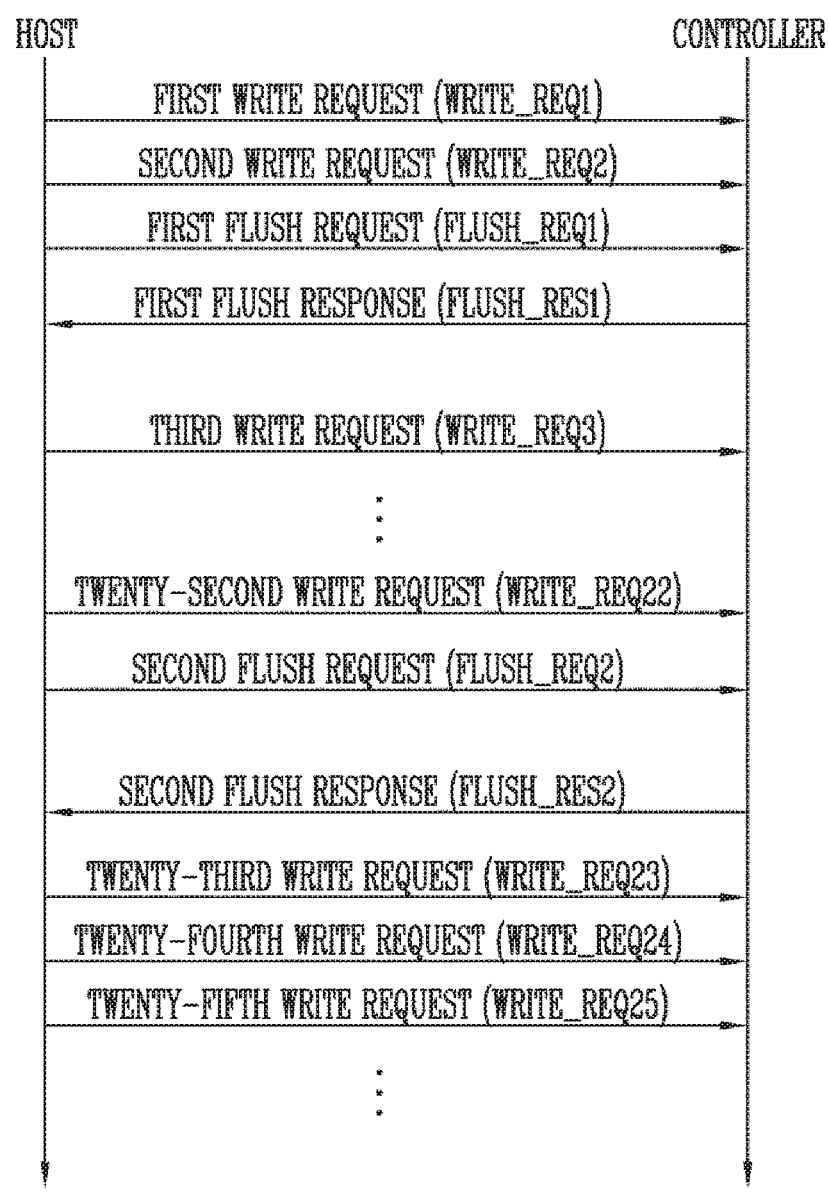
FIG. 7 is a diagram illustrating requests and responses between a host and a memory controller, such as those shown in FIG. 1.

FIG. 7 is a diagram illustrating requests and responses between the host 300 and the memory controller 200, which are shown in FIG. 1.

Referring to FIG. 7, the host 300 and the memory controller 200 may communicate with each other. Specifically, the host 300 may provide a request message REQ_MES to the memory controller 200. The memory controller 200 may provide a response message RES_MES to the host 300. In the embodiment of FIG. 7, the reference or threshold number of write requests or write commands to delay a flush response FLUSH_RES is 20.

In an embodiment, the host 300 may provide a write request WRITE_REQ and a flush request FLUSH_REQ to the memory controller 200.

In an embodiment, the host 300 may provide the memory controller 200 with first and second write requests WRITE_REQ1 and WRITE_REQ2 that have been accumulated or held in the host 300 until a first flush request FLUSH_REQ1, which corresponds to those first and second write requests WRITE_REQ1 and WRITE_REQ2, is provided to the memory controller 200.

When first and second write commands WRITE_CMD1 and WRITE_CMD2 corresponding to the first and second write requests WRITE_REQ1 and WRITE_REQ2s are all stored in the buffer memory of the request message controller 220, a first flush response FLUSH_RES1 corresponding to the first flush request FLUSH_REQ1 may be provided to the host 300. The number of write requests provided to the request message controller 220 before the first flush request FLUSH_REQ1 is provided is two, and therefore, the first flush response FLUSH_RES1 is not delayed but may be immediately output. That is, since the number of write requests provided to the request message controller 220 before the first flush request FLUSH_REQ1 is provided is two, which is less than the reference number of 20, the first flush response FLUSH_RES1 may not be delayed.

Before the first flush response FLUSH_RES1 is provided to the host 300, another request messages REQ_MES may be accumulated or held in the host 300. When the first flush response FLUSH_RES1 is provided to the host 300, third to twenty-second write requests WRITE_REQ3 to WRITE_REQ22 that have been accumulated or held in the host 300 may be provided to the memory controller 200.

When third to twenty-second write commands WRITE_CMD3 to WRITE_CMD22 corresponding to the third to twenty-second write requests WRITE_REQ3 to WRITE_REQ22 are all stored in the buffer memory of the request message controller 220, a second flush response FLUSH_RES2 may be provided to the host 300 in response to a second flush request FLUSH_REQ2, which corresponds to the third to twenty-second write requests WRITE_REQ3 to WRITE_REQ22. The number of write requests provided to the request message controller 220 before the second flush request FLUSH_REQ2 is provided is 20, and therefore, the second flush response FLUSH_RES2 may be delayed. That is, since the number of write requests provided to the request message controller 220 before the second flush request FLUSH_REQ2 is provided is 20, which is greater than or equal to the reference number of 20, the second flush response FLUSH_RES2 may be delayed.

A delay time of the second flush response FLUSH_RES2 may be determined by the number of write requests. The number of write requests provided to the request message controller 220 before the second flush request FLUSH_REQ2 is provided may be 20 or value greater than 20. Since the number of write requests provided to the request message controller 220 is 20 or value greater than 20, the second flush response FLUSH_RES2 may be delayed for a delay time corresponding to the number of write requests among delay times corresponding the number of write requests, respectively, stored in the delay table 233 and then output.

Another write requests may be accumulated or held for the delay time of the second flush response FLUSH_RES2. Therefore, when the memory controller 200 provides the second flush response FLUSH_RES2 to the host 300, the write requests that have been accumulated or held in the host 300 may be provided to the memory controller 200. That is, when the second flush response FLUSH_RES2 is provided to the host 300, the host 300 may provide the memory controller 200 with twenty-third to twenty-fifth write requests WRITE_REQ23 to WRITE_REQ25 that have been held in the host 300.

Figure 8:
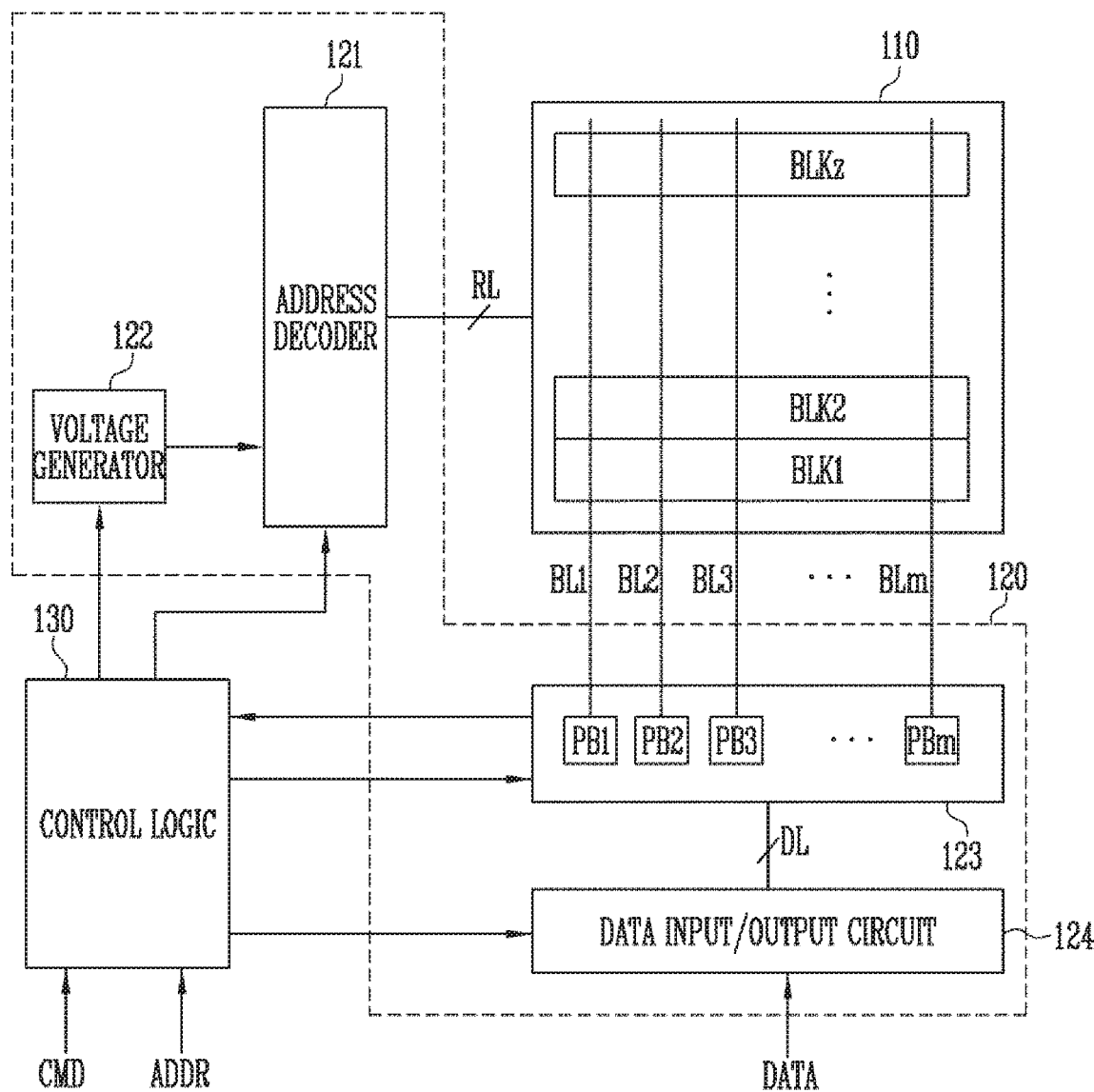
FIG. 8 is a block diagram illustrating a structure of a memory device, such as that shown in FIG. 1.

FIG. 8 is a block diagram illustrating a structure of the memory device shown in FIG. 1.

Referring to FIG. 8, the memory device 100 may include a memory cell array 100, a peripheral circuit 120, and control logic 130.

The memory cell array 110 includes a plurality of memory blocks BLK1 to BLKz. The plurality of memory blocks BLK1 to BLKz are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells.

Each memory block may be a user block for storing user data or a system block for storing system data. A user block may be a free block or a data block according to whether data is stored. The free block does not store any data; it is empty. The data block stores data. The data stored in the data block may be valid data or invalid data.

A block that cannot store any data among the memory blocks may be a bad block. The bad block may be a Manufacture Bad Block (MBB) that is bad when the memory device 100 is manufactured or a Growing Bad Block (GBB) that becomes bad when the memory block is used. In an embodiment, a memory block including a page in which a program fail has occurred may be a GBB.

In accordance with an embodiment of the present disclosure, when a GBB is identified, the corresponding block may be set as a bad block, and erase pages included in the corresponding block may be used to substitute for pages in which a program fail has occurred in another memory block. Therefore, the storage device 50 may control the memory device 100 such that the number of GBB bad blocks does not exceed one.

Each memory block may include a plurality of memory cells for storing data. In an embodiment, the plurality of memory cells may be nonvolatile memory cells. Among the plurality of memory cells, memory cells coupled to the same word line may be defined as one page. That is, the memory cell array 110 may include a plurality of pages. In an embodiment, each of the plurality of memory blocks BLK1 to BLKz included in the memory cell array 110 may include a plurality of dummy cells. One or more dummy cells may be coupled in series between a drain select transistor and memory cells. In addition, one or more dummy cells may be coupled in series between a source select transistor and the memory cells.

Each of the memory cells of the memory device 100 may be a single level cell (SLC) for storing one data bit, a multi-level cell (MLC) for storing two data bits, a triple level cell (TLC) for storing three data bits, or a quad level cell (QLC) for storing four data bits.

The peripheral circuit 120 may include the address decoder 121, a voltage generator 122, the read/write circuit 123, and a data input/output circuit 124.

The peripheral circuit 120 drives the memory cell array 110.

For example, the peripheral circuit 120 may driver the memory cell array 110 to perform a program operation, a read operation, and an erase operation.

The address decoder 121 is coupled to the memory cell array 110 through the row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line WL among word lines of the selected memory block by applying voltages provided from the voltage generator 122 to the word line WL according to the decoded row address.

In a program operation, the address decoder 121 may apply a program voltage to the selected word line, and apply a program pass voltage having a level lower than that of the program voltage to unselected word lines. In a program verify operation, the address decoder 121 may apply a verify voltage to the selected word line, and apply a verify pass voltage higher than the verify voltage to the unselected word lines. In a read operation, the address decoder 121 may apply a read voltage to the selected word line, and apply a read pass voltage higher than the read voltage to the unselected word lines.

In an embodiment, an erase operation of the memory device 100 is performed in units of memory blocks. In an erase operation, the address ADDR input to the memory device 100 includes a block address. The address decoder 121 may decode the block address and select at least one memory block among the memory blocks BLK1 to BLKz according to the decoded block address. In the erase operation, the address decoder 121 may apply a ground voltage to word lines coupled to the selected memory block.

In an embodiment, the address decoder 121 may decode a column address in the address ADDR transmitted thereto. The Decoded Column Address (DCA) may be transmitted to the read/write circuit 123. In an example, the address decoder 121 may include components such as a row decoder, a column decoder, and an address buffer.

The voltage generator 122 may generate a plurality of voltages by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage. The voltage generator 122 may be configured to generate various voltages required by the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal power voltage, and generate a plurality of voltages by selectively activating the plurality of pumping capacitors under the control of the control logic 130. The plurality of generated voltages may be supplied to the memory cell array 110 by the address decoder 121.

The read/write circuit 123 includes first to mth page buffers PB1 to PBm (m is a positive integer). The first to mth page buffers PB1 to PBm are coupled to the memory cell array 110 through the respective first to mth bit lines BL1 to BLm. The first to mth page buffers PB1 to PBm operate under the control of the control logic 130.

The first to mth page buffers PB1 to PBm communicate data with the data input/output circuit 124. In a program operation, the first to mth page buffers PB1 to PBm receive data DATA to be stored through the data input/output circuit 124 and data lines DL.

In the program operation, a program pulse may be applied to a selected word line according to a row address. The first to mth page buffers PB1 to PBm may transfer data DATA received through the data input/output circuit 124 to memory cells of the selected word line through the bit lines BL1 to BLm. At least one memory cell among the memory cells of the selected word line may be programmed according to the transferred data DATA. A threshold voltage of a memory cell coupled to a bit line to which a program allow voltage (e.g., a ground voltage) is applied may be increased. A threshold voltage of a memory cell coupled to a bit line to which a program inhibit voltage (e.g., a power voltage) is applied may be maintained.

In a program verify operation, the first to mth page buffers PB1 to PBm read page data from the memory cells of the selected word line through the bit lines BL1 to BLm.

In a read operation, the read/write circuit 123 reads page data DATA from the memory cells of the selected word line through the bit lines BL, and outputs the read page data DATA to the data input/output circuit 124.

In an erase operation, the read/write circuit 123 may float the bit lines BL. In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 130.

The data input/output circuit 124 may include a plurality of input/output buffers (not shown) that receive input data. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

The control logic 130 may be coupled to the address decoder 121, the voltage generator 122, the read/write circuit 123, and the data input/output circuit 124. The control logic 130 may be configured to control overall operations of the memory device 100. The control logic 130 may operate in response to a command CMD transmitted from an external device.

Figure 9:
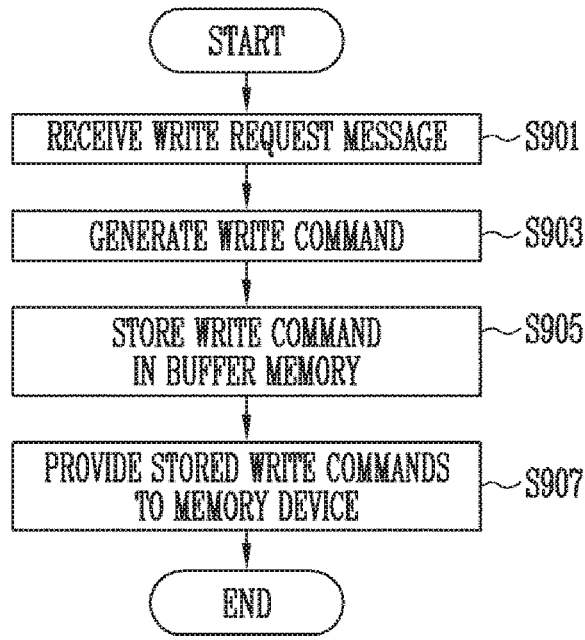
FIG. 9 is a flow chart illustrating an operation of a memory controller in accordance with an embodiment of the present disclosure.

FIG. 9 is a diagram illustrating an operation of the memory controller in accordance with an embodiment of the present disclosure.

Referring to FIG. 9, in step S901, the request message controller 220 may receive a write request WRITE_REQ from the host 300 through the host interface 210. The memory controller 200 may perform an operation in response to the write request WRITE_REQ of the host 300.

In step S903, the request message controller 220 may generate a write command WRITE_CMD corresponding to the write request WRITE_REQ. The generated write command WRITE_CMD may be provided to the memory device 100 through the memory interface 250. The write command WRITE_CMD may direct the memory device 100 to perform a write operation.

In step S905, the generated write command WRITE_CMD may be stored in the buffer memory of the request message controller 220. When a certain threshold number of write commands are stored in the buffer memory of the request message controller 220, the stored write commands may be provided to the memory device 100 through the memory interface 250.

In step S907, the write commands stored in the buffer memory of the request message controller 220 may be provided to the memory device 100. Specifically, when the write commands stored in the buffer memory correspond to a command for programming the whole or a portion of one page, the write commands may be provided to the memory device 100. When the write commands are provided to the memory device 100, the memory device 100 may perform a write operation corresponding to the write commands.

Figure 10:
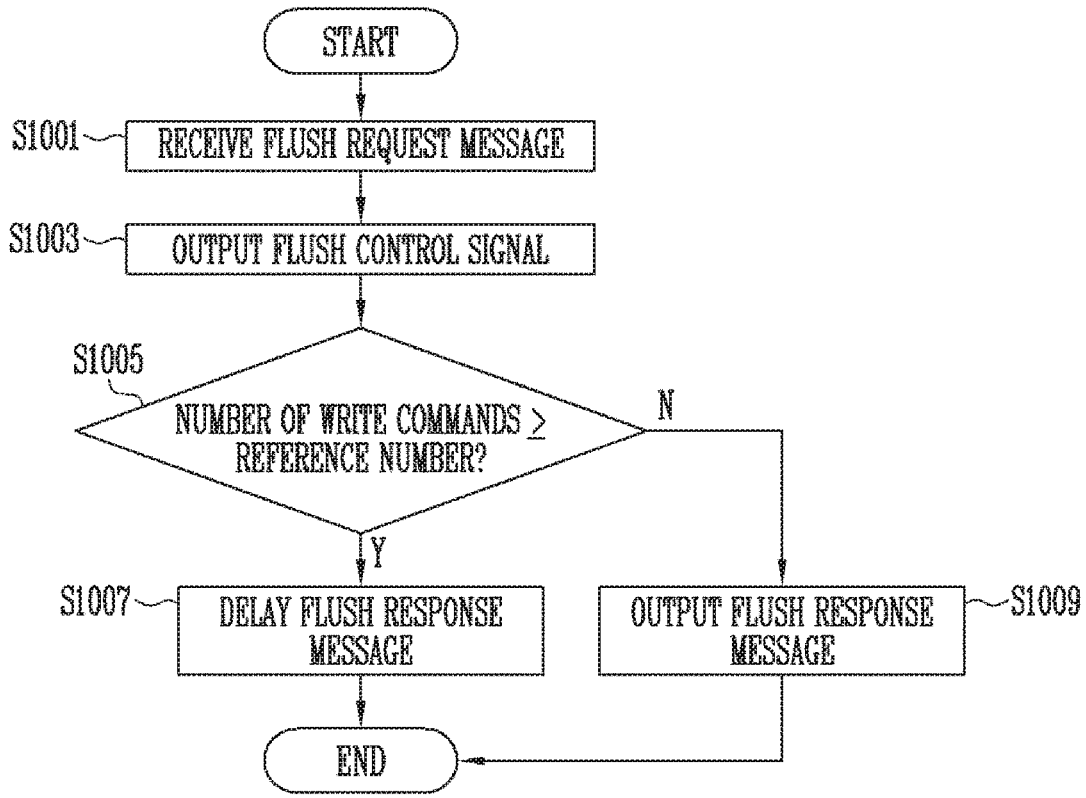
FIG. 10 is a flow chart illustrating an operation of a memory controller in accordance with an embodiment of the present disclosure.

FIG. 10 is a diagram illustrating an operation of the memory controller 200 in accordance with another embodiment of the present disclosure.

Referring to FIG. 10, in step S1001, the request message controller 220 may receive a flush request FLUSH_REQ from the host 300 through the host interface 210. When the request message controller 220 receives the flush request FLUSH_REQ, the memory controller 200 may perform an operation in response to a flush request FLUSH_REQ.

Specifically, when a present flush request FLUSH_REQ of the host 300 is provided, a subsequent request message REQ_MES of the host 300 may not be provided to the memory controller 200 until after the host 300 receives a flush response FLUSH_RES in response to the present flush request FLUSH_REQ. Therefore, the host 300 may merge subsequent flush requests, which are held therein, until after the host 300 receives the flush response FLUSH_RES corresponding to the present flush request FLUSH_REQ.

In step S1003, the request message controller 220 may output a flush control signal FLUSH_SIG. Specifically, the flush control signal FLUSH_SIG may be generated after write commands corresponding to write requests received between the current and previous flush requests are stored in the buffer memory. The flush control signal FLUSH_SIG may be provided to the delay time determiner 230.

When the flush control signal FLUSH_SIG is provided to the delay time determiner 230, the delay time determiner 230 may generate delay information DELAY_INF based on the number of write requests or the write commands and the flush control signal FLUSH_SIG corresponding to the flush request FLUSH_REQ. The delay information DELAY_INF may include information on whether the flush response FLUSH_RES is to be delayed and, if so, a delay time of the flush response FLUSH_RES.

In step S1005, when the flush control signal FLUSH_SIG is output, the request message controller 220 may determine whether the number of write commands corresponding to the flush request FLUSH_REQ is greater than or equal to a reference number, i.e., the certain threshold number. The number of write commands considered in the determination may be those that correspond to the write requests received between the current and previous flush requests. When the number of write commands is greater than or equal to the reference number, the request message controller 220 proceeds to step S1007. Otherwise, the request message controller 220 proceeds to step S1009.

In the step S1007, the response message controller 240 may delay the flush response FLUSH_RES and output the delayed flush response FLUSH_RES. The flush response FLUSH_RES may be provided to the host 300 through the host interface 210. While the output of the flush response FLUSH_RES is being delayed, subsequent request messages REQ_MES may be held in the host 300. Subsequent flush requests may be merged based on that the request messages REQ_MES are held in the host 300.

In the step S1009, the response message controller 240 does not delay the flush response FLUSH_RES but may output the flush response FLUSH_RES. That is, when the delay information DELAY_INF includes information that the flush response FLUSH_RES is not to be delayed, the response message controller 240 may immediately generate a flush response FLUSH_RES after the delay information DELAY_INF is received, and output the flush response FLUSH_RES to the host 300 through the host interface 210.

Figure 11:
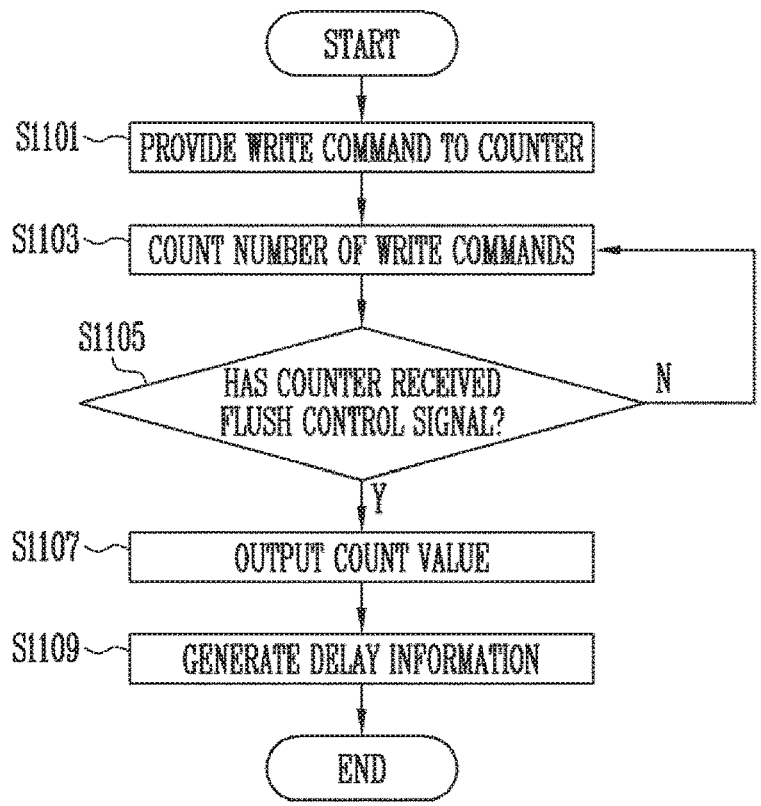
FIG. 11 is a flow chart illustrating an operation of a memory controller in accordance with an embodiment of the present disclosure.

FIG. 11 is a diagram illustrating an operation of the memory controller 200 in accordance with another embodiment of the present disclosure.

Referring to FIG. 11, in step S1101, the request message controller 220 may provide a write command WRITE_CMD stored in the buffer memory to the counter 231 in the delay time determiner 230. The write command WRITE_CMD may be provided to the counter 231 so as to determine whether a flush response FLUSH_RES in response to a present flush request FLUSH_REQ of the host 300 is to be delayed and, if so, a delay time of the flush response FLUSH_RES.

In step S1103, the counter 231 may count a number of write commands provided from the request message controller 220. Specifically, after the counter 231 receives a present flush control signal FLUSH_SIG corresponding to the present flush request FLUSH_REQ, the counter 231 may count a number of write commands corresponding to the present flush request FLUSH_REQ. The write commands counted may be those received between the present and previous flush control signals FLUSH_SIG.

In step S1105, the request message controller 220 may determine whether the counter 231 has received the present flush control signal FLUSH_SIG. When the counter 231 has not received the present flush control signal FLUSH_SIG, the request message controller 220 proceeds to the step S1103. The counter 231 may count a number of write commands received until the present flush control signal FLUSH_SIG is received. When the counter 231 receives the present flush control signal FLUSH_SIG, the request message controller 220 proceeds to step S1107.

In the step S1107, when the counter 231 receives the present flush control signal FLUSH_SIG, the counter 231 may output a count value COUNT_VAL to the delay information generator 232. The count value COUNT_VAL may be provided to the delay information generator 232 so as to determine whether the flush response FLUSH_RES is to be delayed and, if so, a delay time of the flush response FLUSH_RES. The delay information generator 232 may provide the count value COUNT_VAL to the delay table 233 to determine whether the flush response FLUSH_RES is to be delayed and a delay time of the flush response FLUSH_RES.

In step S1109, the delay information generator 232 may generate delay information DELAY_INF by using the count value COUNT_VAL received from the counter 231. Specifically, the delay information generator 232 may receive a count value COUNT_VAL from the counter 231 and provide the count value COUNT_VAL to the delay table 233. The delay information generator 232 may generate delay information DELAY_INF based on the count value COUNT_VAL provided from the counter 231 and table information TABLE_INF provided from the delay table 233.

When the delay information generator 232 receives the table information TABLE_INF from the delay table 233, the delay information generator 232 may generate delay information DELAY_INF. The delay information DELAY_INF may include information on whether a flush response FLUSH_RES corresponding to the flush request FLUSH_REQ is to be delayed and, if so, a delay time of the flush response FLUSH_RES. That is, the delay information DELAY_INF may include information on whether a flush response FLUSH_RES is to be delayed and, if so, a delay time of the flush response FLUSH_RES according to the count value COUNT_VAL among the information stored in the delay table 233.

The generated delay information DELAY_INF may be provided to the response message controller 240.

Figure 12:
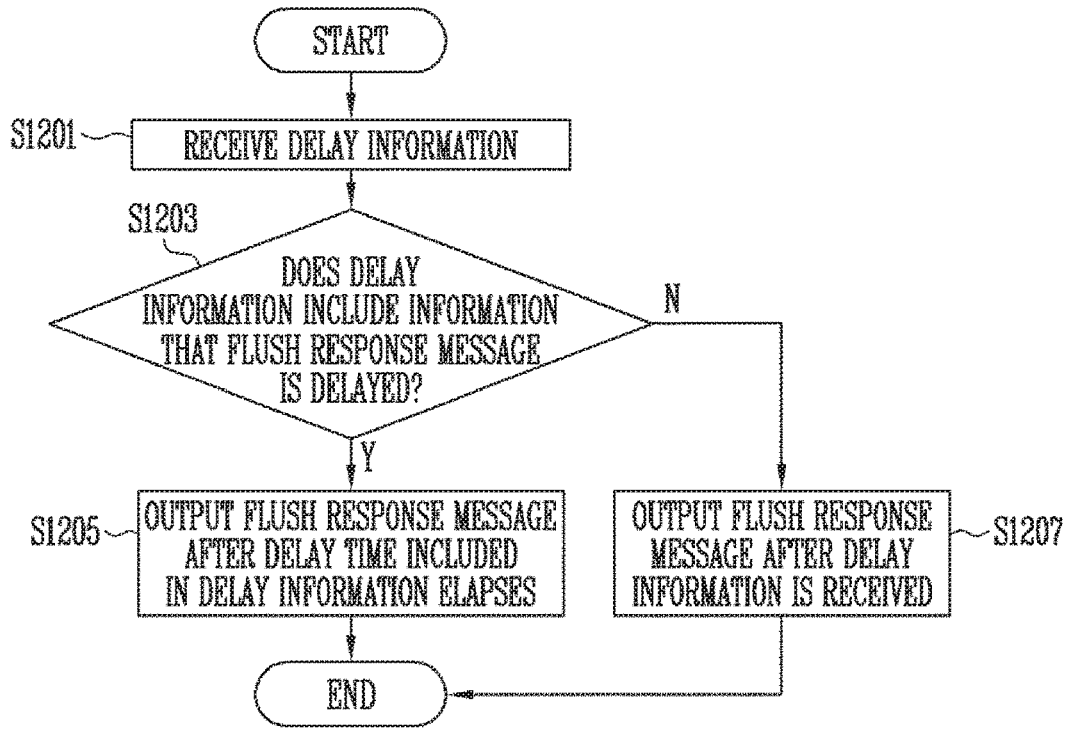
FIG. 12 is a flow chart illustrating an operation of a memory controller in accordance with an embodiment of the present disclosure.

FIG. 12 is a diagram illustrating an operation of the memory controller 200 in accordance with another embodiment of the present disclosure.

Referring to FIG. 12, in step S1201, the response message controller 240 may receive delay information DELAY_INF from the delay information generator 232. The response message controller 240 may determine whether a flush response FLUSH_RES corresponding to a flush request FLUSH_REQ is to be delayed, based on the delay information DELAY_IN F.

In step S1203, the response message controller 240 may determine whether the delay information DELAY_INF includes information that the flush response FLUSH_RES is to be delayed. When the delay information DELAY_INF includes the information that the flush response FLUSH_RES is to be delayed, the response message controller 240 proceeds to step S1205. When the delay information DELAY_INF does not include the information that the flush response FLUSH_RES is to be delayed, the response message controller 240 proceeds to step S1207.

In the step S1205, the delay information DELAY_INF may include information that the flush response FLUSH_RES is to be delayed. The delay information DELAY_INF may further include information on a delay time of the flush response FLUSH_RES. The response message controller 240 may generate the flush response FLUSH_RES, delay the generated flush response FLUSH_RES, based on the delay information DELAY_INF, and output the delayed flush response FLUSH_RES to the host 300 through the host interface 210. The delay time of the output flush response FLUSH_RES may be set based on a number of write commands corresponding to the flush request FLUSH_REQ.

In the step S1207, when the delay information DELAY_INF includes information that the flush response FLUSH_RES is not to be delayed, the response message controller 240 may immediately generate a flush response FLUSH_RES after the response message controller 240 receives the delay information DELAY_INF. The generated flush response FLUSH_RES may be output to the host 300 through the host interface 210.

Figure 13:
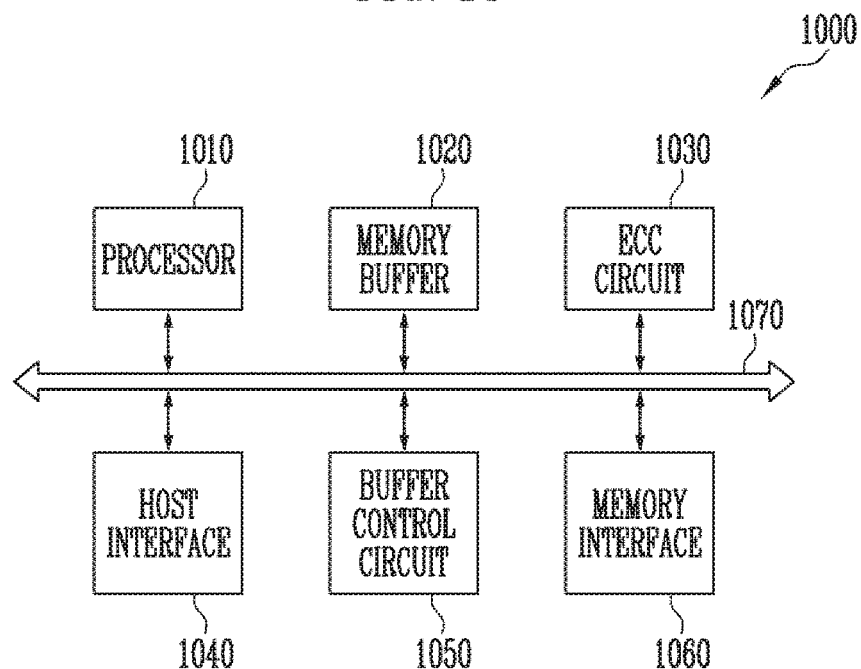
FIG. 13 is a diagram illustrating another embodiment of a memory controller, such as that shown in FIG. 1.

FIG. 13 is a diagram illustrating another embodiment of the memory controller shown in FIG. 1.

A memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

Referring to FIG. 13, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical address (LA) provided by the host through the FTL into a physical address (PA). The FTL may receive an LA, using a mapping table, to be translated into a PA. Several address mapping methods of the FTL exist according to mapping units. Representative address mapping methods include a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. Either or both of these components may be provided separately or one or both of their functions distributed within the memory controller 1000.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other so as not to interfere with, or influence, each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 14:
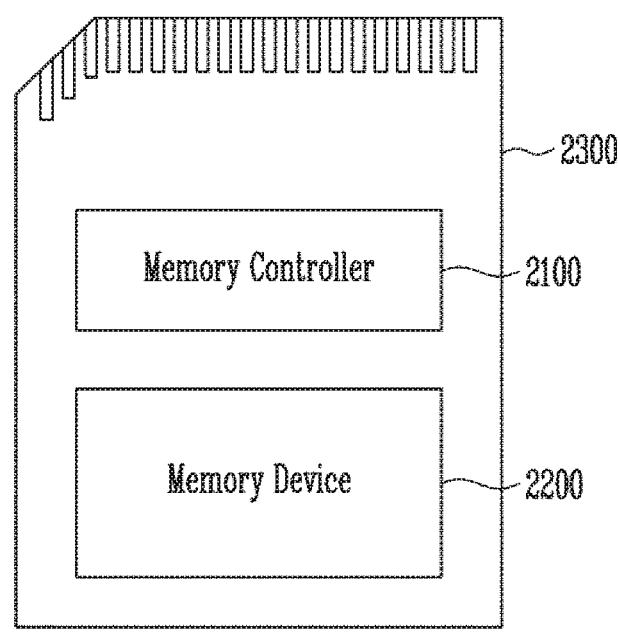
FIG. 14 is a block diagram illustrating a memory card system to which the storage device is applied in accordance with an embodiment of the present disclosure.

FIG. 14 is a block diagram illustrating a memory card system to which the storage device is applied in accordance with an embodiment of the present disclosure.

Referring to FIG. 14, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may be implemented identically to the memory device 100 described with reference to FIG. 8.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device to constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 15:
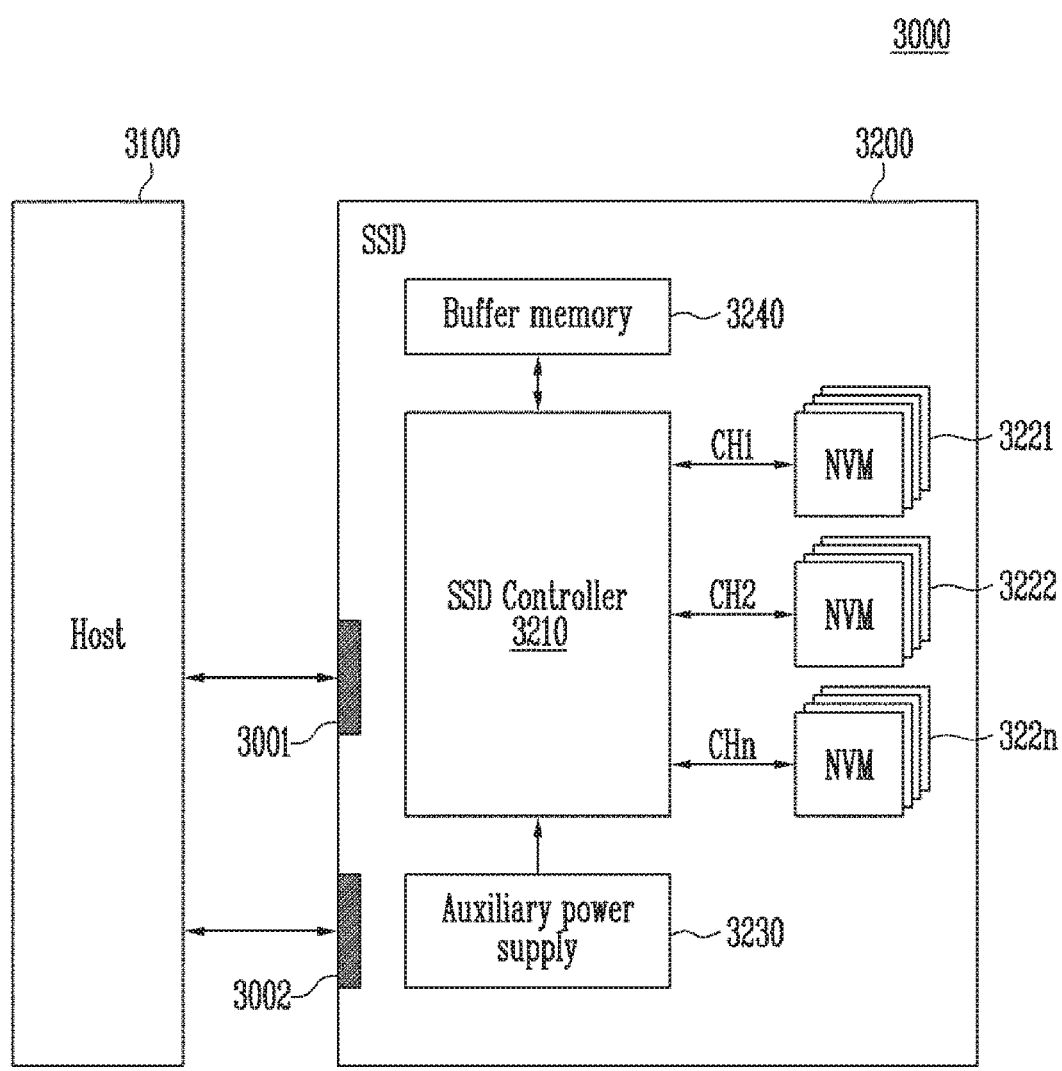
FIG. 15 is a block diagram illustrating a Solid State Drive (SSD) system to which the storage device is applied in accordance with an embodiment of the present disclosure.

FIG. 15 is a block diagram illustrating a Solid State Drive (SSD) system to which the storage device is applied in accordance with an embodiment of the present disclosure.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be based on an interface between the host 3100 and the SSD 3200. For example, the signal SIG may be defined by at least one of interfaces such as a Universal Serial Bus (USB), Multi-Media Card (MMC) an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located externally to the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
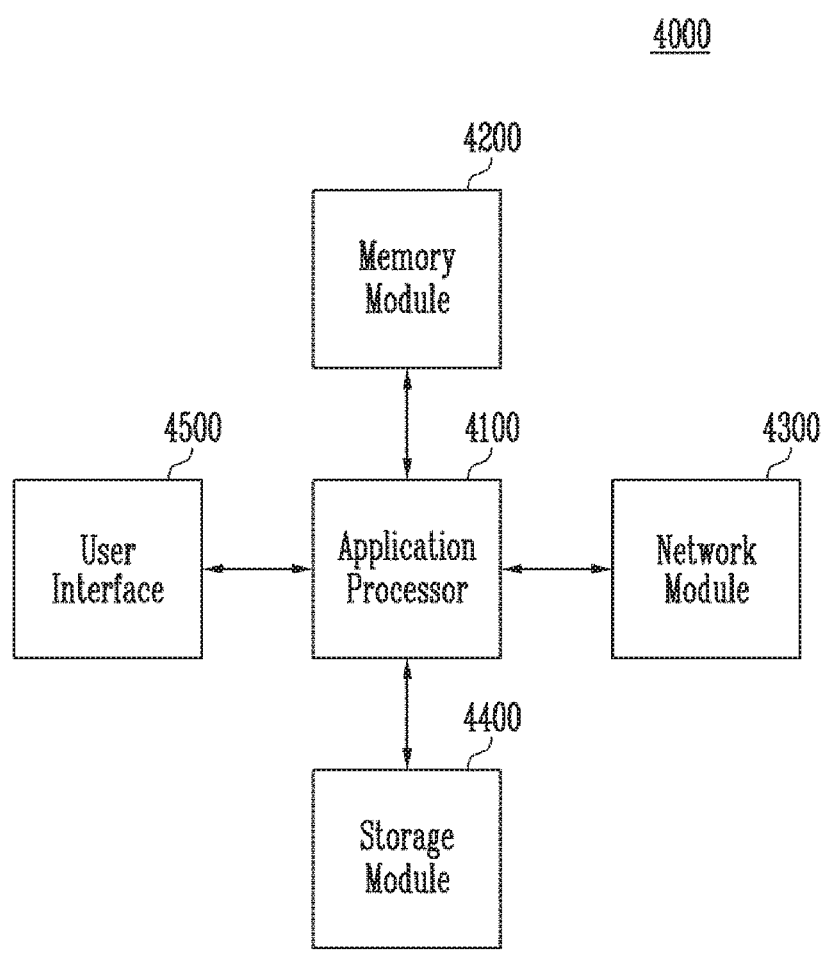
FIG. 16 is a block diagram illustrating a user system to which the storage device is applied in accordance with an embodiment of the present disclosure.

FIG. 16 is a block diagram illustrating a user system to which the storage device is applied in accordance with an embodiment of the present disclosure.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 8. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a motor.

In accordance with embodiments of the present disclosure, a memory controller for processing a flush request and an operating method thereof are provided.

While the present invention has been shown and described with reference to certain embodiments thereof, it will be understood by those skilled in the art in light of the present disclosure that various changes in form and details may be made therein without departing from the spirit and scope of the present invention as defined by the appended claims and their equivalents. Therefore, the scope of the present invention should not be limited to the above-described embodiments but should be determined by the appended claims and equivalents thereof.

In the above-described embodiments, any or all steps may be selectively performed or part of the steps and may be omitted. In each embodiment, the steps are not necessarily performed in accordance with the described order and may be rearranged. The embodiments disclosed herein are to facilitate an understanding of the present invention, not limit it. The present invention encompasses various modifications apparent to those skilled in the art, which modifications can be made on the basis of the technological scope of the present disclosure.

Although specific terminologies are used here, those are only to explain the embodiments of the present disclosure. Therefore, the present invention is not restricted by specific terminology used, as many variations are possible within the spirit and scope of the present disclosure.

What is claimed is:
1. A memory controller comprising:
   a request message controller configured to generate a command or control signal in response to a request of a host;
   a delay time determiner configured to receive a current flush request, generate delay information based on a number of write requests received between a) a last received previous flush request before the current flush request and b) the current flush request; and a response message controller configured to delay a flush response corresponding to the current flush request based on the delay information.

2. The memory controller of claim 1, wherein the request message controller:
when the request is the current flush request, generates a flush control signal; and
when the request is a write request, generates a write command.

3. The memory controller of claim 2, wherein, when the delay time determiner receives the flush control signal, the delay time determiner generates the delay information.

4. The memory controller of claim 2, wherein, when the delay time determiner receives the flush control signal, the delay time determiner generates the delay information based on a number of write commands corresponding to the write requests between the previous flush request and the current flush request.

5. The memory controller of claim 4, wherein, when the number of write commands is greater than or equal to a reference number, the response message controller delays the flush response.

6. The memory controller of claim 4, wherein the response message controller determines a delay time of the flush response based on the number of write commands.

7. The memory controller of claim 2, wherein the delay time determiner includes:
a counter configured to count the number of write commands;
a delay table configured to store information on whether the flush response corresponding to a count value obtained by counting the number of write commands is to be delayed and a delay time of the flush response; and
a delay information generator configured to generate the delay information,
wherein the delay information includes information on whether the flush response is to be delayed and, if so, the delay time of the flush response, which is based on the count value and information corresponding to the count value among the information stored in the delay table.

8. The memory controller of claim 7, wherein the counter increases the count value by 1 as the write commands are input one by one, and provides the count value to the delay information generator when the flush control signal is input to the counter.

9. The memory controller of claim 8, wherein, when the counter provides the count value to the delay information generator, the counter initializes the count value to 0.

10. The memory controller of claim 7, wherein, when the delay information includes information that the flush response is not delayed, the response message controller outputs the flush response to the host after the response message controller receives the delay information.

11. The memory controller of claim 7, wherein when the delay information includes information that the flush response is delayed and information on a delay time of the flush response, the response message controller outputs the flush response to the host after the delay time elapses.

12. A method for operating a memory controller for controlling an operation of a memory device, based on a request from a host, the method comprising:
receiving a current flush request from the host;
generating delay information, based on a number of write requests received between a last received previous flush request before the current flush request and the current flush request;
determining a delay time of a flush response corresponding to the current flush request based on the delay information; and
delaying the flush response corresponding to the current flush request based on the delay information.

13. The method of claim 12, further comprising, when the request is the current flush request, generating a flush control signal.

14. The method of claim 13, wherein, in the generating of the delay information, the delay information is generated, when the memory controller receives the flush control signal.

15. The method of claim 13, wherein, in the generating of the delay information, the delay information is generated based on a number of write commands corresponding to the write requests received between the previous flush request and the current flush request, when the memory controller receives the flush control signal.

16. The method of claim 15, wherein, in the determining of the delay time of the flush response, the flush response is delayed, when the number of write commands is greater than or equal to a reference number.

17. The method of claim 16, wherein, in the determining of the delay time of the flush response, the delay time of the flush response is determined based on the number of write commands.

18. The method of claim 15, wherein the generating of the delay information further includes, as the write commands are all stored in the memory controller, increasing, by 1, a count value that is obtained by counting the number of write commands.

19. The method of claim 18, wherein, when the flush control signal is generated, the count value is initialized to 0.

20. The method of claim 19, wherein, in the generating of the delay information, information including information on whether the flush response is to be delayed and a delay time of the flush response is generated based on the count value.

* * * * *